United States Patent Office 3,250,729
Patented May 10, 1966

3,250,729
NUCLEAR REACTOR ABSORBERS
Günter Petzow, Mannspergstrasse 163, Stuttgart-Lederberg, Germany; Eberhard Preisler, Tannenweg 12, Gerlingen, Wurttemberg, Germany; and Frank Haessner, Traubergstrasse 37, Stuttgart, Germany
Filed Aug. 23, 1963, Ser. No. 304,156
Claims priority, application Germany, Aug. 23, 1962, M 54,000
6 Claims. (Cl. 252—478)

The present invention relates to nuclear reactor absorbers, and more particularly to absorption materials for nuclear reactors which are relatively inexpensive yet approach and even exceed the up to now optimum characteristics of hafnium as absorption material for nuclear reactors, and are particularly suitable for use at high operating temperatures.

All substances having a high neutron absorption capacity which can influence the course of a chain reaction are meant to be comprehended under the conception "absorption materials." In general these materials are used as components of reactors in the form of rods, tubes, plates or powder, which are mainly enclosed particularly in casings of the usual structural materials, for example, refined steel, aluminum or zirconium. According to their function they vary between standard, control or trim elements. Since these individual elements in many types of reactors are joined together into a single unit, and for the most part also consist of the same material, in the following they are always designated as control elements.

Prior to the present invention the known absorption materials were above all cadmium, indium, hafnium, boron and the rare earths gadolinium, samarium and europium, or alloys of these elements. From among these, hafnium and europium, because of their optimum neutron absorption spectra, are particularly suitable. These elements possess besides a high absorption cross section for thermal neutrons a large resonance absorption in epithermal region. Moreover, they have a long life period as neutron absorbers because they form a series of sequential isotopes which can enter into a $(n, \gamma)$-reaction with free neutrons. Although hafnium exhibits practically ideal characteristic and to some extent is considered as standard substance in the development of absorption materials, its broad use is prevented by its limited availability and consequent high price. These disadvantages also apply to europium, although to a somewhat lesser extent than to hafnium. Moreover, the poor corrosion properties and the not sufficiently high melting point of 826° C. do not permit the use of europium in high temperature reactors.

Gadolinium and samarium have only limited usefulness and moreover possess only a short life period as absorber.

Boron, which is mainly used in the form of boron alloys or boron carbide, does not have a long life period as neutron absorber because each boron atom can absorb only one neutron. Consequently lithium and helium are formed during a $(n, \alpha)$-reaction, which only possess inferior absorption cross section and moreover can cause considerable damage in the control elements. A further disadvantage is that the absorption of freed energy can take place substantially only by the dissipation through heat conduction, which under certain circumstances requires additional cooling apparatus. In the case of a $(n, \gamma)$-reaction on the other hand about one-half of the freed energy is dissipated by radiation alone.

Cadmium too which exhibits a high absorption for thermal neutrons, exhibits only an inferior capacity for absorption in epithermal energy region. Its melting point of 321° C. is very unfavorable.

Indium has hitherto not been used in pure form but only as alloying material for absorption materials. Silver-indium-cadmium alloys and silver-europium-cadmium alloys have similar absorption spectra too to the "standard material" hafnium, and also possess good working properties and corrosion properties.

With increasing reactor operating temperatures it is necessary for an absorption material to have a high termal stability in addition to the other properties indicated above. At a lower temperature range of high temperature reactors of 700° C. a series of the usual absorption materials, among which are silver-indium-cadmium and silver-europium-cadmium alloys are not suitable because of the decrease of solidity. Oxides of the rare earths are also not suitable because of polymorphorous transformations. It is therefore a primary object of the present invention to provide new absorption materials in nuclear reactors which possess advantages not possessed by any of the known absorption materials, and which, in general, avoid the various individual or cumulative disadvantages of the known absorption materials, which are indicated above.

It is yet another object of the present invention to provide absorption materials for nuclear reactors which are highly effective at high operating temperatures.

It is still another object of the present invention to provide the possibility of influencing nuclear reactions by carrying out such reactions in the presence of the new absorption materials of this invention.

It is another object of the present invention to provide absorption materials for nuclear reactors which can be used at high operating temperatures and which have both a high absorption capacity in thermal region and a high epithermal resonance cross section.

As still another object, the present invention provides the possibility of adjusting the absorption capacity in thermal region of the epithermal resonance cross section to obtain an absorption material having these characteristics substantially as desired.

Other objects and advantages of the present invention will be apparent from a further reading of the specification and of the appended claims.

With the above and other objects in view, the present invention mainly comprises the use in a nuclear reactor of an absorption material consisting essentially of mixed oxides of at least one metal having high absorption capacity in thermal region and of at least one other metal having high epithermal resonance cross section. The absorption materials of the present invention approach the characteristics of the standard material hafnium, in addition are stable at temperatures above 800° C., do not undergo any alterations in solid condition, and absorb neutrons under $(n, \gamma)$-reactions.

The metals which have high absorption capacity in thermal region so that the same can be used for this characteristic in the mixed oxides of the present invention, are preferably indium, cadmium, mercury and the rare earths. The metals which have high epithermal resonance cross section and which can be used for this property in the mixed oxides of the present invention are preferably hafnium, tantalum, molybdenum, cobalt, manganese, antimony, indium, arsenic and tungsten.

It is preferred according to the present invention to use as absorption material for nuclear reactors a mixture of at least two of the following compounds:

| | |
|---|---|
| Cadmium tantalate | $Cd_2Ta_2O_7$. |
| Indium tantalate | $In_2Ta_2O_8$. |
| Cadmium tungstate | $CdWO_4$. |
| Cadmium indate | $CdIn_2O_4$. |
| Indium molybdate | $In_2(MoO_4)_3$. |
| Cadmium molybdate | $CdMoO_4$. |
| Cadmium antimonate | $Cd_2Sb_2O_7$. |
| Cadmium arsenate | $Cd_2As_2O_7$. |
| Cadmium cobaltate | $CdCo_2O_4$. |
| Cadmium hafniate | $CdHfO_3$. |
| Indium tungstate | $In_2(WO_4)_3$. |
| Indium antimonate | $In_2SbO_4$. |
| Indium arsenate | $InAsO_4$. |
| | and $InXO_3$. |

Wherein X is a rare earth metal. An example of such compound would be indium europate ($InEuO_3$).

Among the most preferred mixtures of compounds for use as absorption material in accordance with the present invention are the following mixtures:

$Cd_2Ta_2O_7$ with $In_2Ta_2O_8$;
$Cd_2Ta_2O_7$ with $In_2(WO_4)_3$;
$Cd_2Ta_2O_7$ with $In_2(MoO_4)_3$;
$CdWO_4$ with $In_2Ta_2O_8$;
$CdIn_2O_4$ with $Cd_2Sb_2O_7$;
$In_2Ta_2O_8$ with $InXO_3$ (X=rare earths);
$CdMoO_4$ with $In_2(MoO_4)_3$.

The compounds which are used in admixture in accordance with the present invention may be indicated as having the general formula $MI_xMII_yO_z$, wherein MI is the portion of termal neutron absorbing elements, MII the portion of epithermal neutron absorbing elements and O the portion of oxygen. The indices $x$, $y$ and $z$ indicate the numbers of the atoms for the structure of the compound.

In the above indicated mixtures of compounds it is possible by adjustment of the amounts of each of the compounds having specific characteristic of absorption capacity in thermal region and epithermal resonance cross section to form an absorption material having these characteristics to a predetermined degree, predetermined characteristics of absorption capacity in thermal region and epithermal resonance cross section.

It is possible to adjust the proportion of the compounds in the mixture within very wide range to obtain the desired characteristics. In such mixture one of the above indicated compounds can be present in an amount of 1–99% by weight, and the other compound in an amount of 99–1% by weight.

In accordance with a preferred embodiment of the present invention there is added to the mixed oxide absorption material of this invention an absorption spectrum-influencing, high melting substance in an amount of up to 50% of the weight of the absorption material. These compounds are high melting compounds, the following being most preferred:

| | |
|---|---|
| $CdF_2$ | $Eu_2O_3$ |
| $Cd_2Nb_2O_7$ | $Gd_2O_3$ |
| $CdSnO_3$ | $Sm_2O_3$ |
| $CdSiO_3$ | $Dy_2O_3$ |
| $CdSiO_4$ | $InPO_3$ |
| $CdTiO_3$ | $In_2O_3$ |
| $CdSe$ | $InF_3$ |
| $Cd_3(PO_4)_2$ | |

The addition of the above compounds to the absorption material of the invention results in an absorption material with increased thermal stability, in addition to giving the possibility of varying the absorption spectrum.

The mixed oxide absorption materials of the present invention, and particularly the mixtures thereof wherein one of the compounds is a high melting compound, or their mixtures with other high melting compounds are either completely or practically completely isotropic they are free of any phase conversions between room temperature and their melting point, which in general is not below 1000° C. As a result, they can be used over a considerably greater range of temperatures than any of the other known types of absorption materials, with the exception of hafnium. As compared to hafnium, the absorption materials of this invention are less expensive and are more generally available.

The absorption materials of the present invention can in general be produced in simple manner by sintering the oxides of metals hafnium, tantalum, molybdenum, cobalt, manganese, antimony, arsenic and tungsten with the particular metal oxides or carbonates of the group of mercury, indium, cadmium and the rare earths, at temperatures of about 1000° C. or higher. The absorption materials thus produced according to the present invention have greater applicability than any other known absorption materials.

It is a simple matter using known procedures in powder metallurgy to form rods, tubes or plates, without any addition of binder, from the absorption materials of this invention. In this form, the absorption materials possess, even at high temperatures, good strength characteristics, which makes the same particularly useful because of their insensitivity to sharp temperature change. In addition, their corrosion resistance against air, carbon dioxide, water and steam, even at high temperatures, is very good.

It is another embodiment of the present invention to either distribute and embed the mixed oxide absorption material of this invention in a solid metal body, or to provide tubular metal bodies, such as casings or the like, in which the mixed oxide absorption material of this invention is carried.

The metals which can be used for carrying the metal oxide absorption material of this invention are the noble metals such as platinum and gold, silver, copper, steel, nickel and molybdenum as well as alloys there of, which do not react with the absorption material at below their melting point. In contrast to steels, molybdenum and nickel, as well as their alloys, the absorption materials of the present invention are stable up to temperatures of about 850° C., and even higher. They can be mixed in all proportions with the powders which serve as the suitable metals for the casings and worked up as metal-ceramic bodies. It is possible to influence the mechanical, physical and chemical properties of the absorption materials in this manner to a very great extent. The amount of the mixed oxide absorption material in the base metal mass can very within a wide range of about 10–90% by weight, and most preferably the amount of the mixed oxide absorption material is about 50% by weight.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
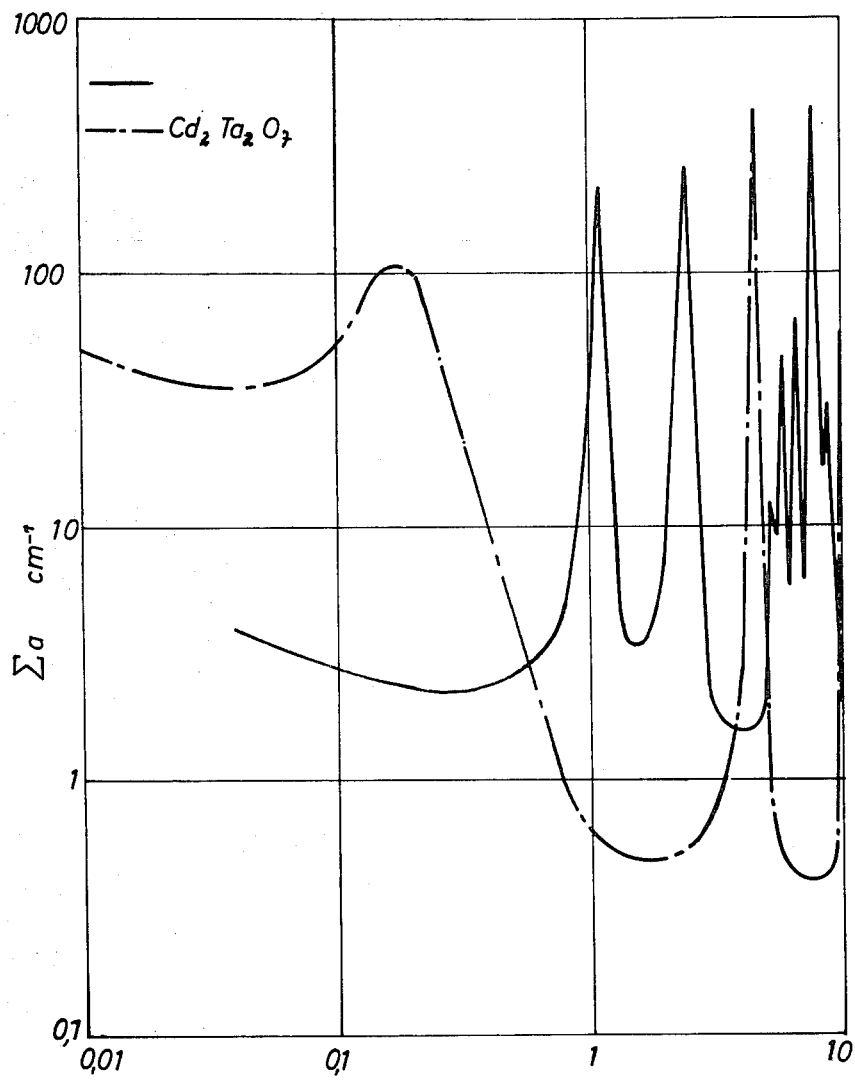
FIG. 1 is a graphic representation of the absorption spectrum of hafnium (solid line) as standard material and cadmium tantalate ($Cd_2Ta_2O_7$) (dot-dash line)
Figure 2:
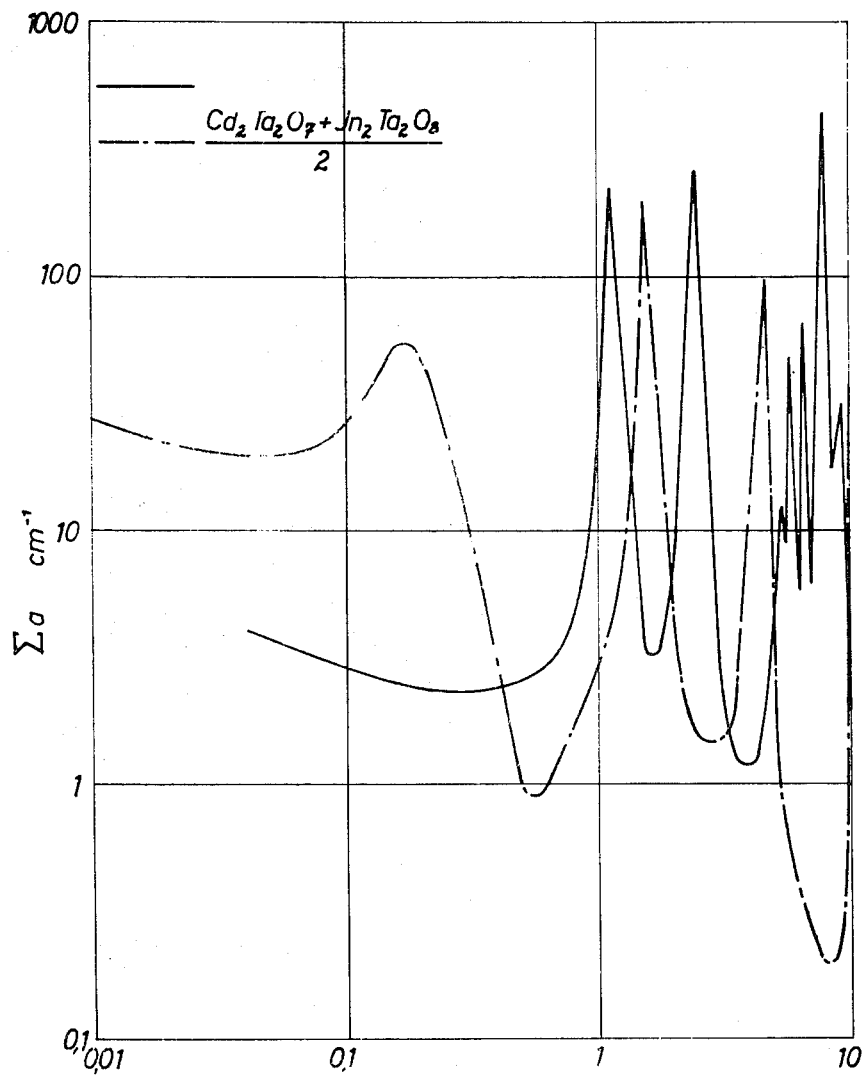
FIG. 2 is a graphic representation of the absorption spectrum of hafnium (solid line) and the absorption spectrum of a 1:1 mixture of indium tantalate-cadmium tantalate ($In_2Ta_2O_8+Cd_2Ta_2O_7$) (dot-dash line)

Referring more particularly to the drawings, FIGS. 1 and 2 are set forth for the purpose of illustrating the effectiveness of the absorption materials of the present invention even as compared to halfnium and particularly of the most preferred embodiment of the present invention of using a mixture of cadmium tantalate and indium tantalate as absorption material.

Figure 3:
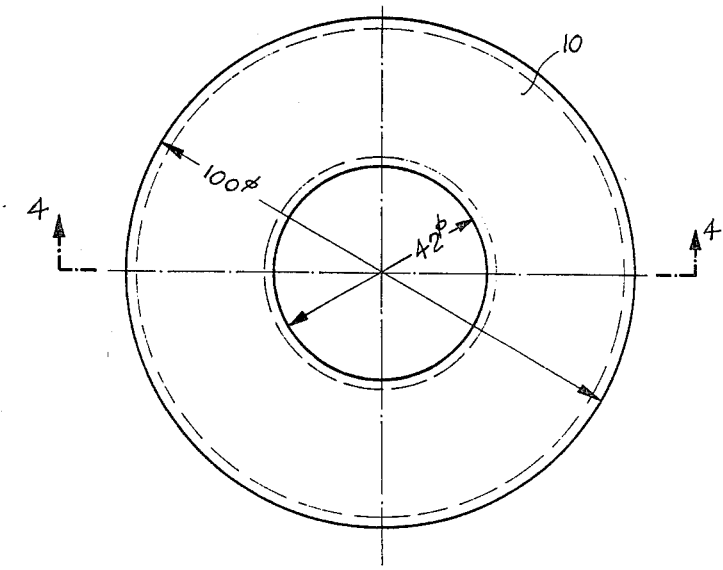
FIG. 3 is a top plan view of a hollow ring body.
Figure 4:
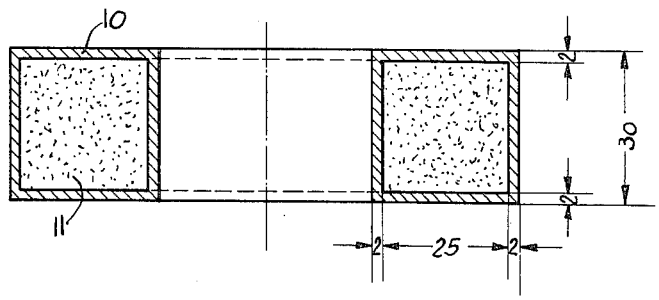
FIG. 4 is a transverse sectional view of the body of FIG. 3 taken along lines 4—4.

Referring more particularly to FIGS. 3 and 4 the same illustrate a hollow ring 10 having the absorption material of the present invention 11, most preferably a 1:1 mixture of indium tantalate and cadmium tantalate carried in the hollow tubular interior thereof. As shown in the figures, the total diameter of the ring is preferably 100 mm. and the inside diameter 42 mm., and the width of the ring (as shown in FIG. 3) exclusive of the thickness of the walls of the ring is 25 mm. The wall thickness of the ring, as shown in FIG. 4, is 2 mm. The height of the ring, including the wall thickness is 30 mm.

In forming a tubular body of the type shown in FIG. 3, the hollow portion of the ring is filled loosely with the absorption material which is lightly tamped in and the ring cover is then melted on.

The following examples are given to further illustrate the present invention. The scope of the invention is not, however, meant to be limited to the specific details of the examples.

Example I

Cadmium tantalate ($Cd_2Ta_2O_7$) is selected as mixed oxide. In FIG. 1 the macroscopic effective cross section $\Sigma a$, is shown. The effective cross section $\Sigma a$ is calculated from the microscopic effective cross section $\sigma$ by multiplication with the number N of nuclei present per unit of volume $\Sigma a = N\sigma [cm.^{-1}]$, based on the standard material, namely halfnium depending on the neutron energy. The absorption spectrum of cadmium tantalate ($Cd_2Ta_2O_7$) is set forth in comparison thereto. As is evident from the graph of FIG. 1, the combination of cadmium and tantalum oxides results in a neutron absorption spectrum which is equal to hafnium while being very much better from the standpoint of economy and even being superior in thermal region.

The effective life of the mixed oxides of the present invention is superior to that of the known cadmium-indium-silver alloys, because the naturally occurring tantalum isotope Ta 181 by the introduction of a neutron is converted to the tantalum isotope Ta 182 which is strongly absorbent in thermal region. As a result the macroscopic effective cross section for thermal region is markedly improved during the operation. Since the neutron absorption in the cadmium tantalate changes to a $(n,\gamma)$-reaction, no damage to the corresponding control element by radiation can occur.

The cadmium tantalate can be obtained as a powder in simple manner by sintering together of cadmium oxide (CdO) and tantalum pentoxide ($Ta_2O_5$) in air at 950° C. and in an aluminum oxide crucible. At a pressure as low as 28 kp./mm.$^2$ pressed bodies thus produced have after 12 hours of heating to glow temperature at 900° C. in air a density of 6.84 g./cm.$^3$ (theoretical density of the powder—8.34 g./cm.$^3$) and a pressure solidity of about 5 kp./mm.$^2$. The good stability to thermal shock treatment is notable. Samples at 1000° C. which are quenched in water exhibit neither macroscopic nor microscopic changes. Isothermic heating to glowing in air have shown that a marked weight loss of cadmium tantalate first starts to occur at temperatures of about 1000° C. This means that the cadmium tantalate can be formed at temperatures up to about 1000° C.

The noble metals and copper and their alloys, as well as nickel and its alloys can be used as material for forming tubular rings and the like at temperatures up to about 800° C. It is also possible to form cermets from these metals and alloys and the cadmium tantalate, which have improved mechanical properties as compared to the pure mixed oxide. Thus, for example, a cermet formed of copper and cadmium tantalate in a ratio of 4:1 is deformable up to 60% with a compression strength of 82 kp./mm.$^2$.

Example II

A 1:1 mixture of indium tantalate ($In_2Ta_2O_8$) and cadmium tantalate ($Ca_2Ta_2O_7$) is chosen as an example of a mixture of compounds in accordance with the present invention. The mixture has an influencing action at temperatures up to 1100° C. There is no melting point lowering of the mixture as compared to the two compounds. The same can be said with respect to the life period effectiveness of this mixture as in Example I.

The macroscopic effective cross section particularly in epithermal region is markedly improved due to the presence of indium (FIG. 2). By formation of tantalum isotope Ta 182 during the operation, in this case too, a strong increase in thermal absorption capacity occurs.

The indium tantalate ($In_2Ta_2O_8$) can be produced analogously to cadmium tantalate ($Ca_2Ta_2O_7$) by sintering together of indium oxide ($In_2O_3$) and tantalum pentoxide ($Ta_2O_5$). In general it has similar mechanical and chemical properties to the cadmium tantalate; however its thermal stability is still better.

By heating to glowing in air at 1300° C. for a long period of time, no marked loss of weight occurs. Indium tantalate is, like cadmium tantalate, resistant to the noble metals and their alloys. With respect to nickel and its alloys the same is stable to about 900° C., and with respect to steels and molybdenum alloys it is stable to about 800° C. In general it can be stated that cadmium tantalate-indium tantalate mixtures have better absorption spectra and greater temperature stability than does the cadmium tantalate of Example I.

Example III

As an example of a mixture of mixed oxides according to the present invention and another compound having an influence on the absorption spectrum, a mixture of indium tantalate ($In_2Ta_2O_8$) with cadmium phosphate is chosen. In this case a favorable absorption spectrum which is similar to that of FIG. 2 is obtained by the addition of a high melting cadmium compound such as $Cd_3(PO_4)_2$ (melting point about 1500° C.) which is highly absorbing in thermal region to the indium tantalate which exhibits good epithermal resonance absorption. The advantage of the cadmium phosphate-indium tantalate mixture to the indium tantalate-cadmium tantalate mixture of Example II alloys mainly in the increasing of the temperature stability to about 1200° C. At this temperature the two compounds still form a sufficiently stable mixture. All other interesting properties of this mixture are similar to the mixture of Example I.

In the above examples and the details given above it is apparent that the absorption materials of the present invention because of their high, slow acting absorption properties for thermal and epithermal neutrons, as well as because of the simple methods of producing the same, their good corrosion properties and operating properties, as well as their high temperature stability, are most suitable absorbing materials for high temperature reactors.

The following example illustrates the formation of metal bodies carrying the absorption materials of the present invention to show the possible variations in relative proportions of the metals such as steels, for example $V_2A$ steel and noble metals and alloys, with respect to the absorption metal of the present invention.

Example IV

The mixed oxides of the present invention in sintered powder form are carried in hollow rings of the metals indicated so that the overall body has its weight distributed in the percentages indicated:

(a)

| | Percent |
|---|---|
| $In_2Ta_2O_8$ | 45 |
| $Cd_3(PO_4)_2$ | 5 |
| $CdWO_4$ | 5 |
| Mo | 45 |

(b)

| | Percent |
|---|---|
| $In_2Ta_2O_8$ | 30 |
| $Eu_2O_3$ | 10 |
| $Cd_2Ta_2O_7$ | 10 |
| Cu | 50 |

(c)

| | Percent |
|---|---|
| $In_2Ta_2O_8$ | 20 |
| $Cd_2Ta_2O_7$ | 20 |
| Cu | 60 |

(d)

| | Percent |
|---|---|
| $In_2TaO_8$ | 25 |
| $Cd_2Ta_2O_7$ | 20 |
| $Cd_3(PO_4)_2$ | 5 |
| Ag | 50 |

It will be understood that each of the elements described above, or two or more together, may also find a useful application in other types of nuclear reactor absorbing material differing from the types described above.

While the invention has been illustrated and described as embodied in nuclear reactor absorbing materials, it is not intended to be limited to the details shown, since various modifications and structural changes may be made without departing in any way from the siprit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a nuclear reactor, an absorption material consisting of a mixture of at least two compounds selected from the group consisting of $Cd_2Ta_2O_7$, $In_2Ta_2O_8$, $CdWo_4$, $CdIn_2O_4$, $In_2(MoO_4)_3$, $CdMoO_4$, $Cd_2Sb_2O_7$, $Cd_2As_2O_7$, $CdCo_2O_4$, $CdHfO_3$, $In_2(Wo_4)_3$, $In_2SbO_4$, $InAsO_4$ and $InXO_3$, wherein X is a rare earth metal.

2. In a nuclear reactor, an absorption material consisting essentially of a mixture of $In_2Ta_2O_8$ and $Cd_2Ta_2O_7$.

3. In a nuclear reactor, an absorption material consisting essentially of mixed oxides of at least one metal having high absorption capacity in thermal region and being selected from the group consisting of indium, cadmium, mercury and the rare earths, and of at least one other metal having high epithermal resonance cross section and being selected from the group consisting of hafnium, tantalum, molybdenum, cobalt, manganese, antimony, indium, arsenic and tungsten, and of a high melting compound which influences the absorption spectrum of said absorption material and being selected from the group consisting of $CdF_2$, $Cd_2Nb_2O_7$, $CdSnO_3$, $CdSiO_3$, $CdSiO_4$, $CdTiO_3$, $CdSe$, $Cd_3(PO_4)_2$, $Eu_2O_3$, $Gd_2O_3$, $Sm_2O_3$, $Dy_2O_3$, $InPO_3$, $In_2O_3$ and $InF_3$.

4. In a nuclear reactor, an absorption material consisting of a mixture of at least two compounds selected from the group consisting of $Cd_2Ta_2O_7$, $In_2Ta_2O_8$, $CdWo_4$, $CdIn_2O_4$, $In_2(MoO_4)_3$, $CdMoO_4$, $Cd_2Sb_2O_7$, $Cd_2As_2O_7$, $CdCo_2O_4$, $CdHfO_3$, $In_2(Wo_4)_3$, $In_2SbO_4$, $InAsO_4$ and $InXO_3$, wherein X is a rare earth metal, and of a high melting compound which influences the absorption spectrum of said absorption material and being selected from the group consisting of $CdF_2$, $Cd_2Nb_2O_7$, $CdSnO_3$, $SdSiO_3$, $CdSiO_4$, $CdTiO_3$, $CdSe$, $Cd_3(PO_4)_2$, $Eu_2O_3$, $Gd_2O_3$, $Sm_2O_3$, $Dy_2O_3$, $InPO_3$, $In_2O_3$ and $InF_3$.

5. In a nuclear reactor, an absorption material consisting essentially of mixed oxides of at least one metal having high absorption capacity in thermal region and being selected from the group consisting of indium, cadmium, mercury and the rare earths and of at least one other metal having high epithermal resonance cross section and being selected from the group consisting of hafnium, tantalum, molybdenum, cobalt, manganese, antimony, indium, arsenic and tungsten, and of a high melting compound which influences the absorption spectrum of said absorption material and being selected from the group consisting of $CdF_2$, $Cd_2Nb_2O_7$, $CdSnO_3$, $CdSiO_3$, $CdSiO_4$, $CdTiO_3$, $CdSe$, $Cd_3(PO_4)_2$, $Eu_2O_3$, $Gd_2O_3$, $Sm_2O_3$, $Dy_2O_3$, $InPO_3$, $In_2O_3$ and $InF_3$ in an amount of up to 50% of the weight of said absorption material.

6. In a nuclear reactor, an absorption material consisting of a mixture of at least two compounds selected from the group consisting of $Cd_2Ta_2O_7$, $In_2Ta_2O_8$, $CdWo_4$, $CdIn_2O_4$, $In_2(MoO_4)_3$, $CdMoO_4$, $Cd_2Sb_2O_7$, $Cd_2As_2O_7$, $CdCo_2O_4$, $CdHfO_3$, $In_2(Wo_4)_3$, $In_2SbO_4$, $InAsO_4$ and $InXO_3$, wherein X is a rare earth metal, one of said compounds being present in an amount of at least 1% of the weight of said mixture, and the other of said compounds being present in an amount of up to 99% of the weight of said mixture.

References Cited by the Examiner

UNITED STATES PATENTS

| | | | |
|---|---|---|---|
| 2,859,163 | 11/1958 | Ploetz et al. | 176—93 |
| 2,992,178 | 7/1961 | Lustman et al. | 176—93 |
| 3,031,395 | 4/1962 | Precht | 176—93 |
| 3,117,372 | 1/1964 | McNees et al. | 176—93 |

FOREIGN PATENTS 634,711  1/1962  Canada.

OTHER REFERENCES

Anderson et al., "Neutron Absorber Materials for Reactor Control" 1962, published by AEC, page 113.

REUBEN EPSTEIN, *Primary Examiner.*

CARL D. QUARFORTH, *Examiner.*

M. R. DINNIN, *Asssistant Examiner.*